June 23, 1959     O. H. UHLÉN     2,891,345
FISHING LINE SUBMERGERS
Filed June 6, 1957
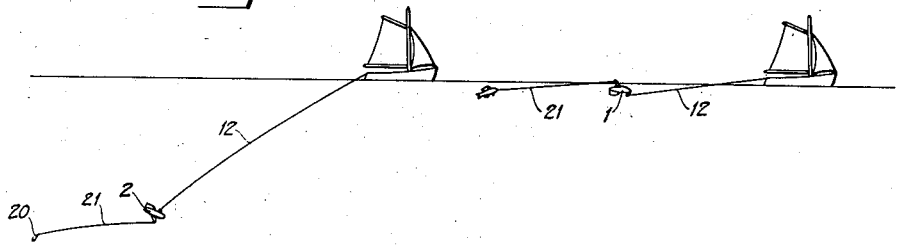
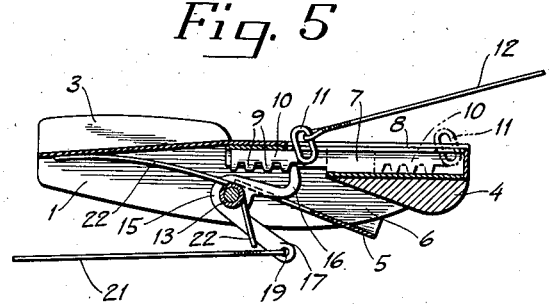
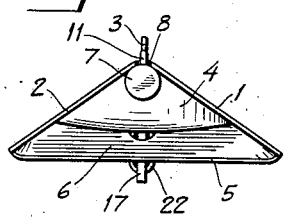
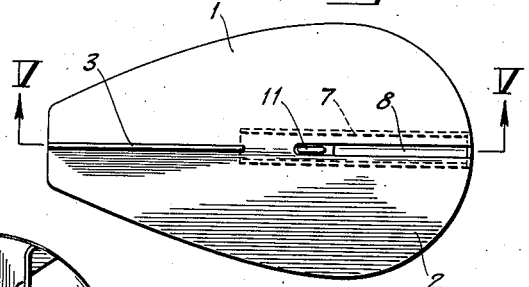
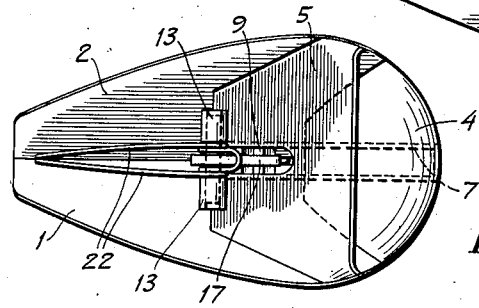
INVENTOR
OLOF HENNING UHLÉN
BY
ATTORNEYS 2,891,345

FISHING LINE SUBMERGERS

Olof Henning Uhlén, Onsala, Sweden

Application June 6, 1957, Serial No. 664,017

1 Claim. (Cl. 43—43.13)

The present invention relates to such fishing line submergers which are provided with a first attachment for a fishing line by which the submerger is moved through the water and a second attachment for a line connecting the hook with the submerger, which is further provided with guide planes which normally keep the submerger at a certain depth under the water surface when attached to a fishing line used for trolling.

More specifically, the invention relates to such submergers of the aforesaid kind, in which the attachment for the fishing line is detachably retained in a rear position by means of a pivotally mounted pawl which will release the attachment when the connecting line is pulled by a fish taking the hook, so that the attachment is permitted to move to a position adjacent the front end of the submerger.

The invention is mainly characterized by the fact that said first attachment is displaceably carried in a guide arranged longitudinally of the submerger and that the guide planes and the weight distribution of the submerger are so arranged, that when the submerger is moved through water with said first attachment in said front position, the submerger will be turned about its axis 180° relative to its normal position and in said turned position be guided by said guide planes toward the water surface.

With such a submerger the fisherman, when a fish is taking the hook, will feel not only a pull in the fishing line at the displacement of the attachment from the retracted position to the position at the front end of the submerger, but shortly after the fish has taken the hook the submerger will appear at the water surface.

According to a preferred embodiment of the invention, the fishing line attachment is provided with a number of ratchet teeth co-acting with said pawl and distributed longitudinally of the submerger, for the purpose of permitting the attachment to be secured in different positions longitudinally of the submerger, thereby presetting the depth at which the submerger and hook will travel.

One embodiment of the invention is illustrated in the accompanying drawing, in which:

Figure 1 is a diagrammatic view showing, to the left, the normal under-water position of the submerger and, to the right, the submerger after the hook has been taken by a fish and the submerger accordingly has risen to the surface;

Figure 2 is a top plan view of a submerger according to the invention;

Figure 3 shows the submerger seen from the under side;

Figure 4 is a front view, and

Figure 5 is a longitudinal section through the submerger taken on the line V—V in Figure 2.

The submerger which may be made of plastic, such as nylon, or any other suitable material, comprises two guide planes 1 and 2 arranged symmetrically relative to the longitudinal middle plane of the submerger and an obtuse angle relative to one another. In normal position of the submerger, the guide planes 1 and 2 form the upper side of the submerger which is further provided with an upwardly projecting and longitudinally of the submerger extending fin or rudder 3. At its front end the submerger is provided with a weight 4 disposed at the under side of the guide planes. At the under side of the submerger, there is further provided an obliquely disposed guide plate 5, between which and the weight 4 there is a free space 6. In the upper part of the front portion of the submerger there is arranged a longitudinal channel member 7 which opens upwardly through a restricted, longitudinal slot 8, and in said channel member there is disposed a ratchet rack 10 provided with ratchet teeth 9, said rack being displaceable from the front position indicated in broken lines in Figure 5 to the rear position shown in full lines in Figure 5. To the front end of rack 10 there is attached a ring 11 partly extending through the slot 8 and to which is attached the fishing line 12. At the rear edge of guide plate 5 there are disposed a couple of sleeves 13 in which by means of a pin there is pivotally carried an angle lever 15, one arm 16 of which extends forwardly and is made in the form of a pawl for cooperation with the ratchet teeth 9 and the other arm 17 of which is directed downwardly-forwardly, and has a hole 19 in its free end, a line 21 connecting the hook and the submerger being attached to said hole. The angle lever 15 is actuated by a spring 22, which tends to keep the ratchet pawl 16 in engagement with one of the teeth 9. When the submerger is moved through the water with the ratchet rack 10 and the attachment ring 11 in the retracted position shown in full lines in Figure 5, the submerger, by action of the guide planes 1, 2, is kept at a certain depth under the water surface. This depth will be greater the more retracted the position of the ring 11 is. The submerger may thus be adjusted for travel at the desired depth by securing the ratchet rack 10 in a more or less retracted position by means of the pawl 16. When a fish is taking the hook 20, the angle lever 15 is swung clockwise according to Figure 5, whereby the ratchet rack 10 is released and moves together with the attachment ring 11 to the position indicated in broken lines in Figure 5. The guide planes 1, 2 and the weight 4 are so arranged, that when the submerger is moved through water with the attachment ring 11 in the last-mentioned position, the submerger will turn 180° around its longitudinal axis and the guide planes 1, 2 will then steer the submerger to the water surface. Due to this and to the pull on the fishing line which the fisherman will notice when the ratchet rack 10 and the attachment ring are displaced he will observe the bite, so that he may haul in the fishing line and the fish.

The invention is not limited to the embodiment hereinbefore described and as shown in the accompanying drawing, said embodiment being subject to modifications without departing from the spirit of the invention.

What I claim is:

A fishing line submerger comprising a plate bent along its longitudinal middle plane providing a pair of symmetrical planes extending at an obtuse angle relative to one another, said plate having a longitudinally extending slot in one end portion thereof, a channel member connected to said plate beneath and in communication with said slot, a weight connected to said channel member, a rack slidably mounted in said channel member, a fishing line connector carried by said rack and extending through said slot, an angle lever pivotally connected to said plate with one arm forming a pawl for engaging said rack and the other arm extending from said plate for being connected to a bait line, resilient means tending to retain said pawl in engagement with said rack for retaining said rack at various positions relative to said channel member until released by a pull on said bait line whereupon said fishing line pulls said rack to the weighted end of said plate indicating such action to the user and causing the surfacing of the submerger.

References Cited in the file of this patent

UNITED STATES PATENTS

| | | |
|---|---|---|
| 1,288,552 | Foster | Dec. 24, 1918 |
| 1,408,927 | Bond | Mar. 7, 1922 |
| 2,234,943 | Nyman | Mar. 11, 1941 |